May 12, 1959   L. KATZMAN ET AL   2,885,750
COVER AND REMOVABLE SPOUT EXTENSION FOR A VAPORIZER
Filed April 18, 1957   2 Sheets-Sheet 1

INVENTORS
LAWRENCE KATZMAN,
MEYER BLOCK
& IRVIN J. GERSHEN
BY
Moses, Nolte + Nolte
ATTORNEYS May 12, 1959   L. KATZMAN ET AL   2,885,750
COVER AND REMOVABLE SPOUT EXTENSION FOR A VAPORIZER
Filed April 18, 1957   2 Sheets-Sheet 2

INVENTORS
LAWRENCE KATZMAN,
MEYER BLOCK
& IRVIN J. GERSHEN
BY
Moses, Nolte & Nolte
ATTORNEYS

United States Patent Office 2,885,750
Patented May 12, 1959

2,885,750

COVER AND REMOVABLE SPOUT EXTENSION FOR A VAPORIZER

Lawrence Katzman, New York, and Meyer Block, Port Washington, N.Y., and Irvin J. Gershen, Springfield, N.J., assignors to Kaz Manufacturing Co., Inc., New York, N.Y., a corporation of New York Application April 18, 1957, Serial No. 653,646

3 Claims. (Cl. 21—117)

This invention relates to a new and improved cover and vapor spout extension for a vaporizer.

It is an object of this invention to provide a cover with a removable spout extension which can be mounted when desired to the vaporizer cover to assist in channeling the vaporizer spray being emitted through the opening in the vaporizer cover.

It is a further object of this invention to provide a removable spout extension and cover assembly which is inexpensive to manufacture, easy to assemble and having a minimum number of parts.

Other objects will hereinafter appear with reference to the following drawings in which.

Figure 1:
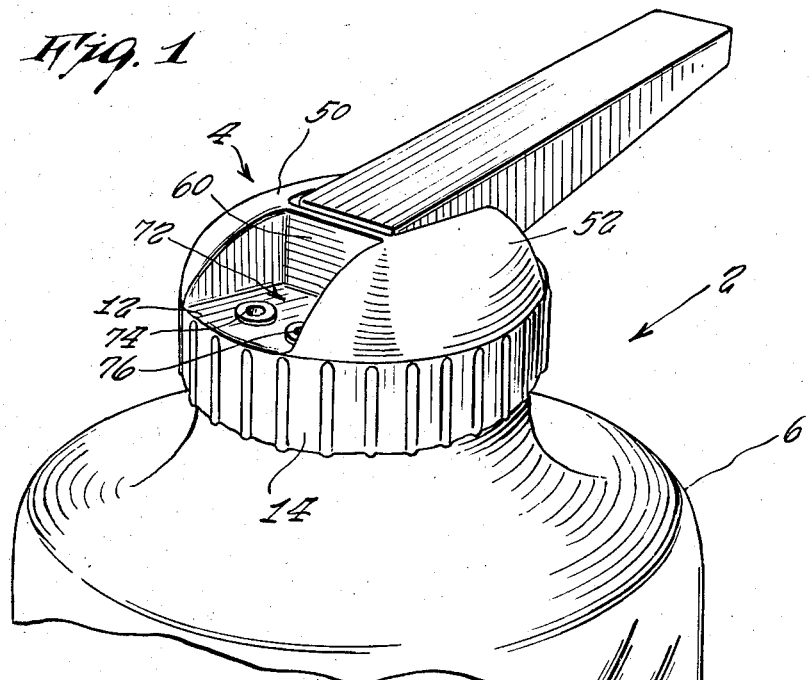
Fig. 1 is a perspective view of the vaporizer spout extension mounted to the vaporizer cover.

Referring now to Fig. 1 there is generally shown a vaporizer 2 where the cover and spout extension member assembly 4 is positioned on the vaporizer jar 6.

This cover and spout extension member assembly is generally composed of two parts (Fig. 2), a removable spout extension member 8 and a cover member 10. The flat base portion 12 of cover member 10 has a substantially circular configuration and has a downward extending flage 14. Normally this flange 14 would have a screw thread on its interior surface 16 which would engage complementary threads on the neck of the jar 6. However, in the preferred embodiment shown therein, the engagement of the cover member to the jar is a frictional fit wherein the surface 16 of flange 14 is smooth and flange 14 tapers slightly outward. On the exterior surface 18 of flange 14 is a plurality of substantially vertical beads 20 which provides a gripping surface to insure positive engagement of the surface 16 with the neck of jar 6.

In the preferred embodiment of our invention, both the cover member 10, and the removable spout extension member 8, are made of a molded plastic material. However, it is well understood that these component parts could be made of any suitable material without departing from the spirit of this invention.

Figure 2:
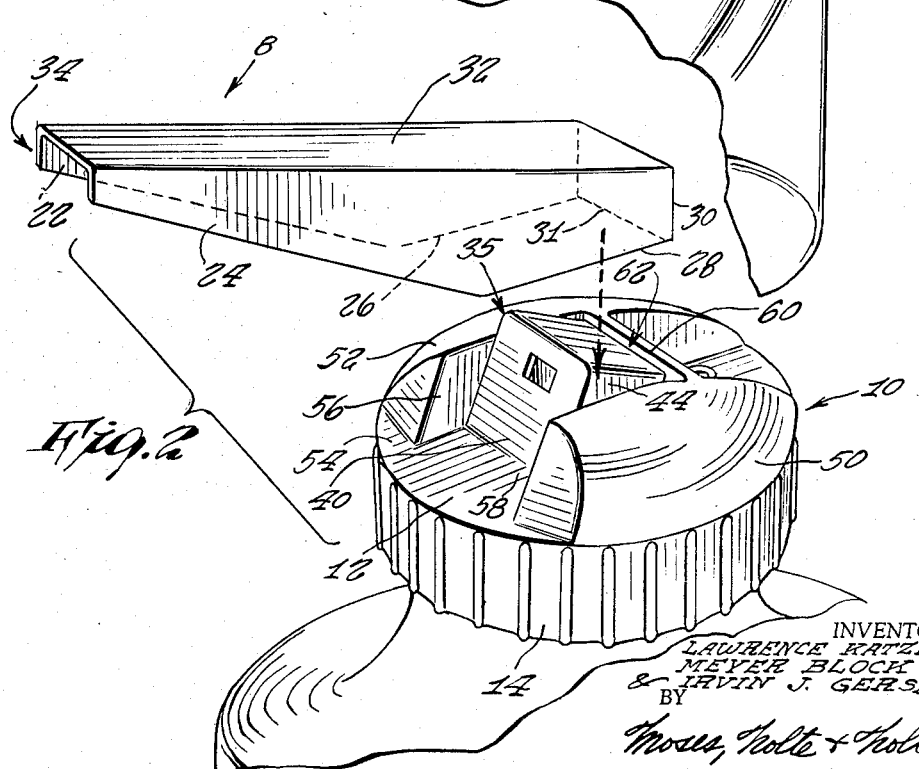
Fig. 2 is a perspective view of the invention as shown in Fig. 1 wherein the vaporizer spout is disassembled from the removable spout member.

The removable spout extension member 8 is substantially an elongated inverted U-shaped, channel member wherein the side walls 22 and 24 have substantially horizontal edges 26, 28, respectively, at their rear portions. The side walls are interconnected by a rear wall 30 (Fig. 2). The side walls 22, 24 taper upwardly at their forward edge so that the top wall 32, of spout extension member 8, is inclined upwardly throughout the length of spout extension member 8. It is therefore seen that the open nozzle end 34 of this spout extension member 8 is slightly elevated when the edges 26, 28 of side walls 22, 24 are resting on a substantially horizontal surface.

Figure 4:
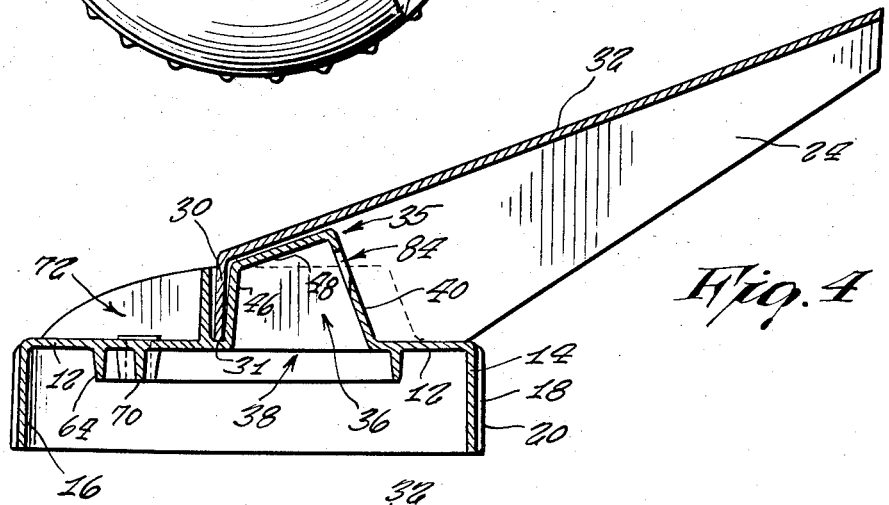
Fig. 4 is a sectional view taken along the line 4—4 of Fig. 3.

The base 12 of cover member 10 has a raised substantially centrally disposed portion forming a spout 35 having a hollow vapor emitting chamber 36 (Fig. 4) which is in open communication with the interior of jar 6 through the opening 38. The spout includes a slanted front wall 40, substantially vertical side walls 42, 44, a rear wall 46 and a slanted roof or top wall 48. As seen in Fig. 4, the slant of roof 48 would be a parallel slant to that of the top wall 32 of the removable spout extension member 8, when the edges 26, 28 of the side walls 22, 24 of the spout member are in a substantially horizontal position resting on base 12.

Positioned on base 12 of the cover member 10 are two substantially identical raised domed portions 50, 52. The outer edge of these domed portions follow substantially the curved edge 54 of the cover member and taper upwardly towards the center of the cover member 10. These domed portions 50, 52 have inner substantially vertical walls 56, 58 which are substantially parallel to, but spaced from, the side walls 42, 44 of the spout 35. The two domed portions 50, 52 are connected by a partition wall 60 which is substantially parallel to, but spaced from, the rear wall 46 of hollow chamber 36.

Figure 5:
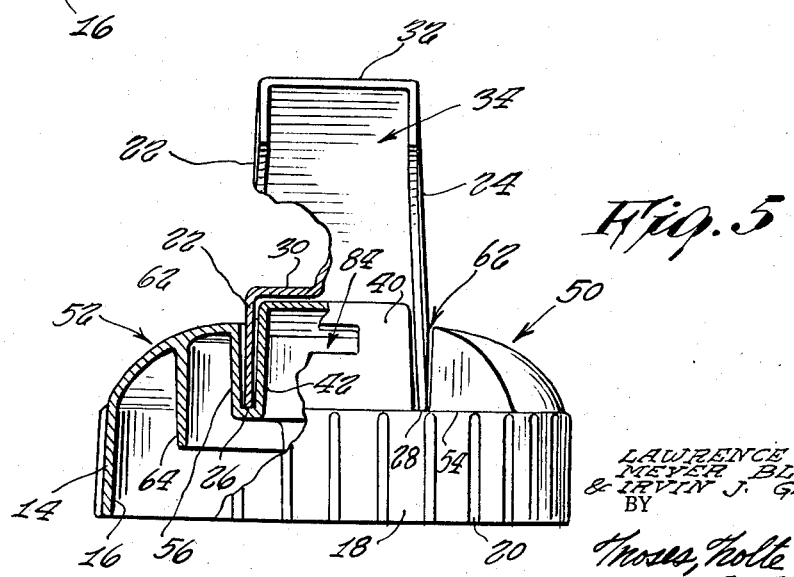
Fig. 5 is a front view partly in section and with parts broken away.

Referring to Fig. 2, it is seen that between the vertical walls 56, 58 of domed portions 50, 52 and partition wall 60, and the walls 42, 44, 46 of spout 35, is a substantially U-shaped recess or groove 62. All the aforementioned walls have a substantially slight taper (Figs. 4 and 5), from top to bottom, so that the groove 62 is slightly larger at its top than at its bottom. This groove forms the seating recess to receive the rear substantially horizontal edges 26, 28 of walls 22, 24 of the removable spout member, when assembled to the cover member 20, and the bottom edge 31 of wall 30.

The spout extension member 8 is mounted in the seating groove 62 by moving the spout substantially in the direction as indicated by the arrow 86 (Fig. 2) so that the edges 26, 28 of side walls 22, 24 and the edge 31 of rear wall 30 will fall into the complementary and cooperating U-shaped groove 62 as hereinabove set forth. Since there is a slight angle or taper to the side walls, as hereinabove set forth, this spout extension member 8 will be securely seated and fixedly held in position as against its own weight.

Figure 3:
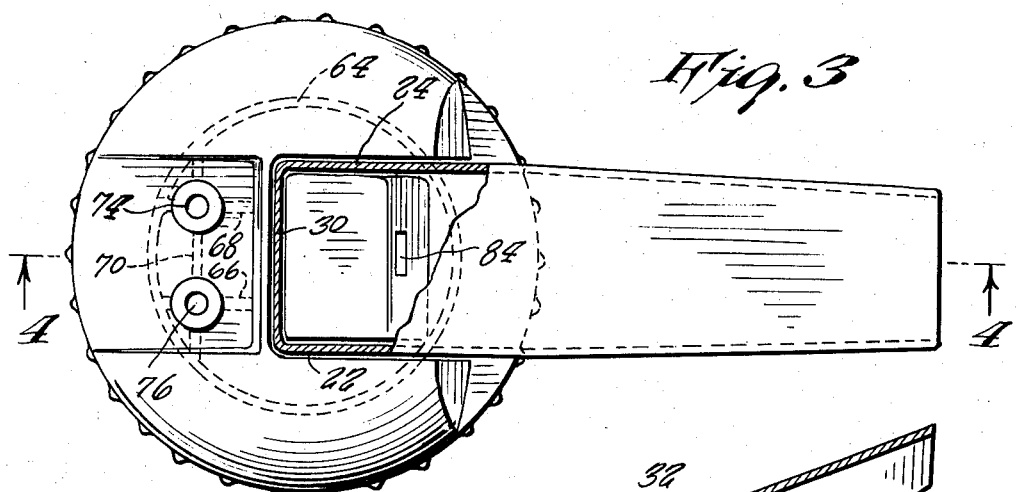
Fig. 3 is a top view with parts broken away.

A flanged member 64 extends downwardly from the flat base portion 12 on the interior of cover member 10 as seen in Fig. 3 and 4. Ribs 66, 68 and 70 (Fig. 3) are provided on the interior of base 12, of cover member 10, interconnected with flange 64. At the rear of the cover member behind partition wall 60 and between the domed portions 50, 52 is a recess or cavity opening 72 wherein are located the openings 74, 76.

Ribs 66, 68, 70 cooperate to support the electrodes (not shown) which protrude through openings 74, 76 into recess 72, where the electrodes are connected to a suitable source of current.

These electrodes (not shown) such as those described in U.S. application Serial No. 481,544, filed January 13, 1955, to which the outside current source is connected, cause the operation of the vapor producing apparatus which is contined within the jar. Since the operation of this vapor producing apparatus is fully set forth in U.S. application, Serial No. 481,669, filed January 13, 1955, and forms no parts of this invention, a detailed description of this vapor producing apparatus will not be herein included.

It is therefore seen during operation that when a suitable source of current is supplied, the vaporizing apparatus (not shown) produces vapor which passes through opening 38 into chamber 36 and will issue through the opening 84 in wall 40 of spout 35. A removable spout extension member 8, as hereinbefore described, may be placed into the U-shaped recess 62 on base 12 of cover member 10 to assist in channeling the vapors emitted from the vaporizer.

While changes may be made in the detailed construction as hereinbefore set forth, what we desire to cover by Letters Patent is set forth in the appended claims.

We claim:

1. A cover for a vaporizer including in combination a cover member and a spout extension member in removable engagement therewith, said cover member having an upwardly extending spout means comprising upwardly extending side walls, a front wall, rear wall, and a roof member, said front wall having an opening therein to allow for passage of the vapors from the interior of said vaporizer, upwardly extending abutting means positioned adjacent said side and rear walls of said spout means and forming a substantially U-shaped channel surrounding said spout means for seating and engaging said spout extension member, said spout extension member also having a back wall, two side walls and a roof member, the back wall and a portion of the side walls of said spout extension member being shaped to fit into said U-shaped channel, the roof of said extension spout being inclined upwardly when said spout extension member is in position on said cover member, and the front portion of the lower edges of the side walls of said spout extension member also being inclined upwardly when said spout extension member is in position on said cover member.

2. A cover for a vaporizer according to claim 1 wherein the roof of said spout means and the roof of said spout extension means are substantially coincident in pitch.

3. A cover for a vaporizer according to claim 2 wherein said abutting means comprises two laterally disposed dome shaped members and a centrally disposed partition member joining said dome shaped members, and wherein said cover is provided with two openings therein for accommondating electrodes.

References Cited in the file of this patent

UNITED STATES PATENTS 2,580,793    Katzman  ---------------- Jan. 1, 1952